Jan. 4, 1949.    D. P. LAVIETES    2,458,391
SCREW AND DRIVER
Filed July 26, 1947
Fig.1
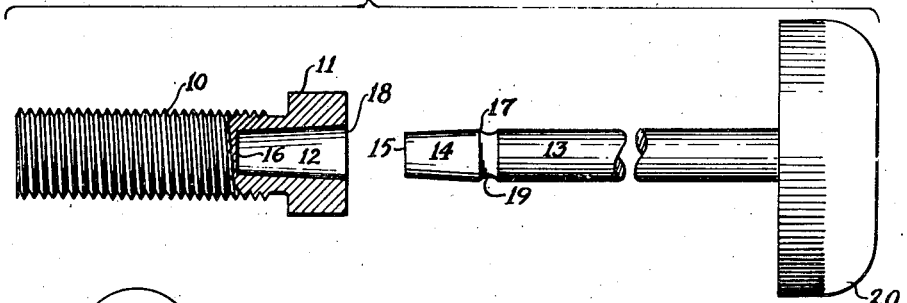
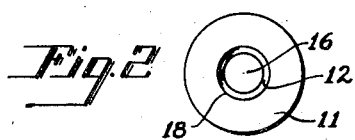
Fig.2
Fig.3
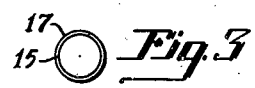
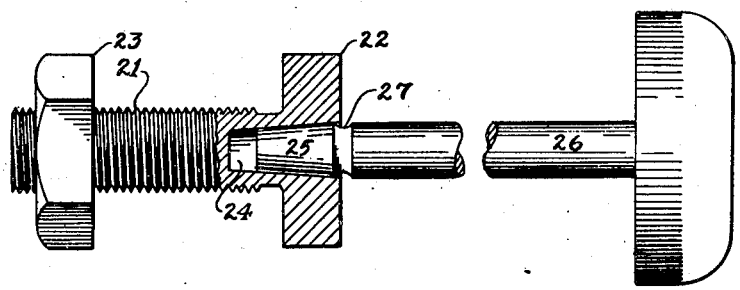
Fig.4
Fig.5
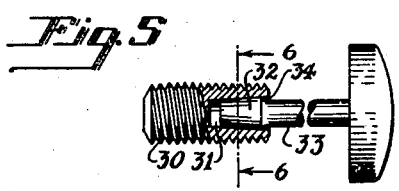
Fig.7
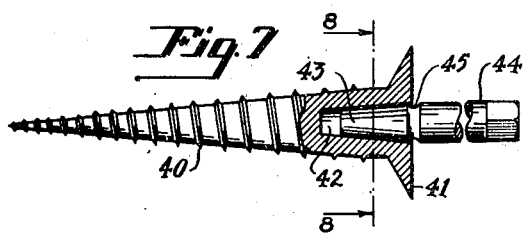
Fig.6
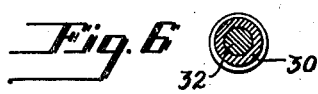
Fig.8
INVENTOR.
David P. Lavietes
BY
ATTORNEY Patented Jan. 4, 1949

2,458,391

UNITED STATES PATENT OFFICE 2,458,391

SCREW AND DRIVER

David Paul Lavietes, Sparta, N. C.

Application July 26, 1947, Serial No. 763,786

1 Claim. (Cl. 145—50)

Various types of screws with slotted ends, special heads and sockets to be driven by tools shaped to fit the screw ends, heads or sockets have been proposed and many are in use.

My invention relates to the type of screw having a tapered socket in the end and a special driver by which the screw can be held and driven. So far as I know, in spite of the fact that it has many advantages of simplicity and unusual application, there has heretofore been no commercial use of such an arrangement. I have discovered that this type can be successfully developed by a special design or proportioning of the driver with respect to the socket in the screw.

The broad invention is applicable to screws of all types, i. e. wood, machine, bolts, set screws and to various types of heads. Broadly stated it consists in providing a tapered conical socket in the screw to receive the tapered head of the driver. This driver head must be of the same taper as the socket and of such a length and diameter that it will never reach the bottom of the socket and is cut away so that it will always clear the entrance to the socket.

Fig. 1 is a side view and partial section showing the invention as applied to a machine type screw with a driver shown in alinement with the socket.

Fig. 2 is an end view of the screw member.

Fig. 3 is an end view of the driver.

Fig. 4 is a side view and partial section showing the invention as applied to a bolt with a driver inserted into the socket of the bolt.

Fig. 5 is a side view and partial section showing the invention as applied to a set screw with a driver in place.

Fig. 6 is a cross sectional view taken on the plane of the line 6—6 of Fig. 5.

Fig. 7 is a side view and partial section showing the invention as applied to an ordinary wood screw and with a driver in place.

Fig. 8 is a cross sectional view taken on the plane of the line 8—8 of Fig. 7.

In the form shown in Figs. 1 and 2 the machine screw has an externally screw threaded stem 10 and a head 11 of any suitable shape and a socket 12 which is conically tapered and extends into the stem and preferably to a depth greater than the thickness of the head. The driver 13 has a head 14 tapered to correspond exactly with the taper of the socket. This head is case hardened or of very hard alloy and usually much harder than the metal of the screw threaded member. The outer end 15 of the driver head is of a diameter larger than the bottom of the socket at 16 so that the driver will never reach the bottom of the socket. The rear end 17 of the driver head is no greater in diameter than the outer or entrance 18 to the socket and preferably a little smaller and is cut away at 19 so that the head can always make a sliding fit in the socket without forming a shoulder on the driver as it would if the enlarging taper of the head continued outside the socket.

The driver may have a handle 20 or be driven in any other suitable manner. Pressure is applied to the driver and it becomes in effect a part of the screw by the frictional engagement. The driver is then rotated until the screw is seated whereupon the driver will automatically disconnect itself from the screw.

Such a driver can be used equally well to drive a right handed screw or a left handed screw and similarly by reverse rotation of the driver the screw may be retracted or withdrawn.

The bolt 21 of Fig. 4 has a head 22 of any suitable shape and a nut 23. The head and shank of the bolt is provided with a conically tapered socket 24 to receive the tapered head 25 of the driver 26. The head and socket are proportioned as above described in connection with the head 14 and socket 12 and the driver shank is cut back or grooved at 27 to ensure the proper seating of the head in the socket.

The set screw 30 of Figs. 5 and 6 has a socket 31 to receive the head 32 of the driver 33. The handle may be suitably shaped to facilitate application of considerable pressure. It will be noted that the head is cut back and terminates at 34 inside the entrance to the socket.

The wood screw 40 of Figs. 7 and 8 may have any suitable shape of head 41 and in fact might have a conventional slot. The important feature is the tapered socket 42 to receive the head 43 of the driver 44. Here also the head is cut away at 45 to ensure full seating of the head in the socket.

The size of the socket in any screw should be proportioned to the size of the screw and the degree of taper should be small. Greater proportional pressure is required to turn a screw where the angle of the taper is greater.

Such a driver may be used with any form of handle or be driven by power or by a brace.

The cut back at 19, 27, 34 and 45 in the various forms need be very slight and should leave the smallest diameter of the driver only a little less than the maximum diameter of the head say a few thousandths of an inch in order to utilize the maximum strength of the material.

When the driver is intended to be hand driven the handle grip such as 20, 26 or 33 should be of sufficient size to afford a good grip and permit adequate pressure.

With such a screw and driver it is possible to pick up and attach a screw on the driver and apply it in any direction without danger of its falling off.

I claim:

A metallic screw member having a head and a screw threaded shank, said head having a conical socket formed therein and in axial alignment with the shank, said socket being tapered inwardly from its entrance toward its bottom and a screw driver having a conical hardened screw engaging head tapered to correspond with the socket and having a free end portion, said screw engaging head being of less length than the depth of the socket and the minimum diameter of the screw engaging head being at said free end and being greater than the minimum diameter of the socket, the maximum diameter of said screw engaging head being slightly less than the diameter of the socket at its entrance.

DAVID P. LAVIETES.

REFERENCES CITED

The following references are of record in the file of this patent:

UNITED STATES PATENTS

| Number | Name | Date |
| --- | --- | --- |
| 52,631 | Weaver | Feb. 13, 1866 |
| 1,007,107 | Hulsmann | Oct. 31, 1911 |
| 2,369,853 | Purtell | Feb. 20, 1945 |